June 30, 1936.  J. ADASKIN  2,045,562

BANKING DEVICE FOR VEHICLES

Filed June 15, 1934   2 Sheets-Sheet 1

JOHN ADASKIN,
INVENTOR,

BY Marks and Clerk,
ATTORNEYS.

June 30, 1936.   J. ADASKIN   2,045,562
BANKING DEVICE FOR VEHICLES
Filed June 15, 1934   2 Sheets-Sheet 2
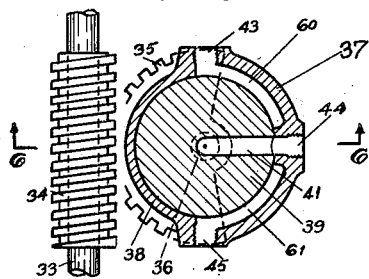
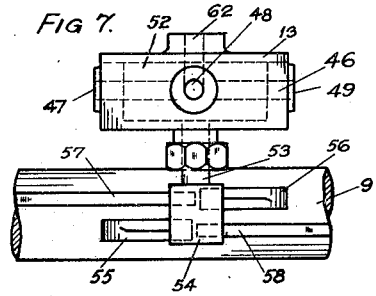
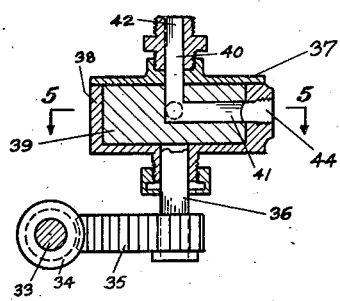
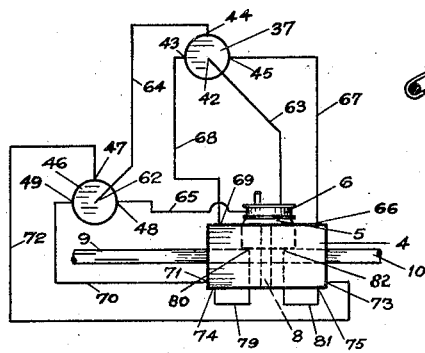
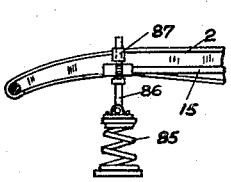
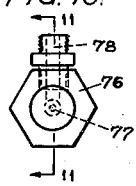
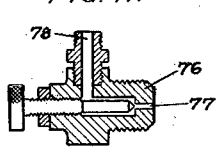
JOHN ADASKIN.
INVENTOR.
BY Marks and Clerk,
ATTORNEYS.

Patented June 30, 1936

2,045,562

UNITED STATES PATENT OFFICE 2,045,562

BANKING DEVICE FOR VEHICLES

John Adaskin, Toronto, Ontario, Canada

Application June 15, 1934, Serial No. 730,823

14 Claims. (Cl. 280—87)

The present invention relates to a device for elevating the one side of the chassis of a vehicle and lowering the opposite side when the car is travelling around a curve in the roadway, the primary purpose of said device being the comfort of passengers in said vehicle.

In travelling around a curve in the roadway, in vehicles not provided with the present device, the passengers are normally thrown by centrifugal force toward the outer periphery of the curve, and this tendency is so strong that the said occupants often have to take hold of part of the car body in order to replace themselves in position after the curve has been passed. In order to avoid this condition, the present device counteracts the effect of the centrifugal force by "banking" the outer side of the vehicle frame, and lowering the inner side of same, as is at once understood.

By means of the device in hand, the last described feature is mechanically and automatically performed by the normal operation of the drive shaft and the steering wheel of the vehicle which co-act to bring the various parts of the device into operation. If the vehicle is travelling slowly very little tilting or "banking" effect is performed by the mechanism in hand in going around the curve, but if the speed is increased, additional oil pressure is furnished the device due to the increase in speed of the drive shaft of the vehicle, and as a result a greater amount of "banking" or tilting of the frame of the vehicle is accomplished. It is at once seen that this automatic adjustment of the operation of the device in hand in accordance with the speed of the vehicle in going around the curve is in accordance with the requirements needed to give comfort to the passengers.

The mechanism which "banks" or tilts the frame of the automobile is connected by means of an oil pressure pump with the drive shaft of the vehicle at a point in the rear of the clutch, so that when the motor is idling and the car is coasting, and the rear wheels only driving the drive shaft, the tilting mechanism will still be in operation. This is seen to be a desirable feature of the device in hand. Certain pressure relief valves are used in the device, which may be adjusted to the particular car and mechanism on which it is used, and any losses or gains of pressure in the oil system with which it is equipped, as will be explained herein.

The apparatus or device in hand is so arranged that when the vehicle is travelling at a speed of ten or fifteen miles an hour going around a curve, the banking of the car is very slight because pressure is not created great enough in the oil pressure system used, to create very much tilting at slow speeds. The banking of the vehicle being strictly in accordance with the speed of travel of the vehicle and it is seen that this is a much more desirable means of operation of the device in hand than if the power used to operate the device were derived from an independent motor having a constant speed of operation from such motor.

The device can be attached with very little change to the existing types of chassis now in use for motor vehicles. Means is also provided with the present invention for use of the device in connection with the "knee-action" types of springs used with the latest model cars.

In the drawings, Figure 1 is a plan view of the frame or chassis of an automobile, showing the general arrangement of the parts of my invention mounted thereon.

Figure 5 is an enlarged section on line 5—5 of Figure 6, taken through the oil control valve, and showing the shaft of the steering column of the automobile and the gears which operate said valve.

Figure 6 is a central vertical section on line 6—6 of Figure 5.

Figure 7 is a plan view of the intermediate oil valve, and a portion of the piston stem which operates said valve in the present invention.

Figure 8 is a side elevation of Figure 7.

Figure 9 is a diagrammatic plan view showing the system of oil lines, valves, pump and hydraulic jack used in the invention.

Figure 10 is an end view of an adjustable relief valve used.

Figure 11 is a central vertical section of Figure 10 taken on line 11—11 thereof.

Figure 12 is a side elevation of a "knee-action" spring used for supporting the forward end of automobiles, showing the means of attachment of the present invention mounted thereon.

Figure 1:
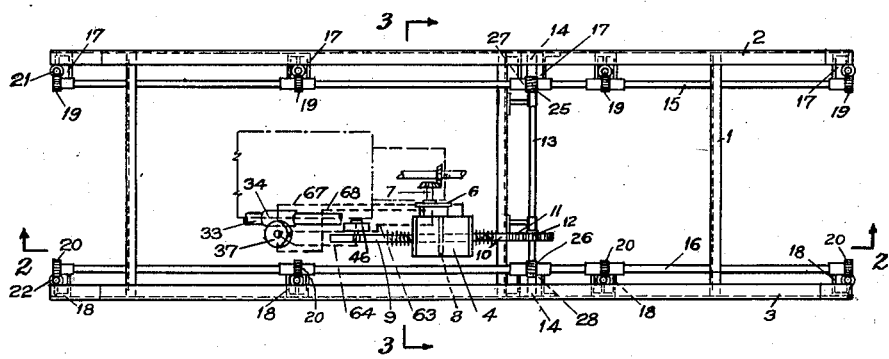

In the drawings, the numeral 1 indicates the frame of an automobile, having two longitudinal channels 2, 3 forming part thereof. A hydraulic jack 4 is mounted on the frame of the automobile, and a pump 6 is also mounted adjacent to said jack and is provided with an oil sump 5, the pump being provided with an operating shaft 7. The operating shaft 7 is connected by suitable gearing, with the drive-shaft of the automobile at a point at the rear of the clutch and said operating shaft receives its power by the revolution of the said main drive-shaft. The purpose of placing the actuating mechanism of the operating shaft at the rear of the clutch is for the purpose of operating the oil pump 6 as long as the drive shaft is revolved, whether same receives its motion from the engine, or merely from the revolution of the rear wheels of the automobile.

Figure 3:
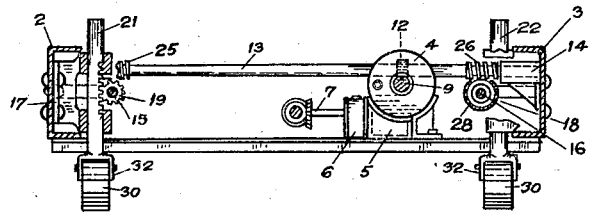
Figure 3 is a transverse, vertical section on line 3—3 of Figure 1.

Within the hydraulic jack 4 is a reciprocating piston head 8, having a pair of piston stems 9 and 10 protruding from said jack and at opposite ends of the same. On the piston stem 10 is a rack 11, which engages the gear 12 on the transverse shaft 13. The transverse shaft 13 is mounted in suitable bearings 14, 14 on the channels 2 and 3 of the frame as illustrated in Figure 3 of the drawings.

On both sides of the vehicle frame 1 and adjacent to channels 2 and 3 are mounted the longitudinal shafts 15, 16. Said shafts 15, 16 are revolvably carried by the channels 2 and 3 respectively by means of supports 17, 18 etc. The said shafts 15, 16 are provided with a plurality of pinions rigidly mounted thereon as at 19, 20 etc.

On the channels 2 and 3 are slidably mounted the vertically disposed jack shafts 21, 22 etc.

The gears 19, 20 etc., are adapted to engage the jack shafts 21, 22 respectively as shown at a plurality of points along each side of the frame, adjacent to the channels 2, and 3.

On the transverse shaft 13, near the opposed ends thereof are a pair of worms 25, 26 which engage the worm gears 27, 28 respectively which are on the longitudinal shafts 2 and 3, and operate said worm gears and shaft in reverse directions, the one from the other, as seen in Figure 3 of the drawings. From what has been said it is seen that as the pump operates the piston stem 10, by oil pressure operating in the hydraulic jack 4, as described below, the transverse shaft 13 revolves in forward or reverse directions in accordance with the reciprocation of piston stem 10; and further, as the transverse shaft 13 revolves in a clockwise or anti-clockwise direction the shafts 15, 16 revolve, the gears 19, 20 operate and the jack shafts 21, 22 etc., lift or depress the vehicle frame channels 2, and 3 by means of their connections with the springs 29, 30 etc., of the automobile. The various jack shafts 21, 22 etc., are preferably connected with the springs as illustrated in Figure 3 to wit; directly by a direct pivot connection at points 31, 31 or by means of a shackle connection as at 32, 32, but any suitable connections may be used at these points. It is observed that as the gears 19, 20 etc., operate in reverse directions, and the channels 2 and 3 are always lifted and depressed at the same period of operation, as required whenever a vehicle makes a turn on the road, and as will be explained herein.

The stem 33 of the steering wheel is provided with a worm 34 (Figs. 1, 5 and 6), which is in engagement with the semi-worm gear 35 on the operating stem 36 of the valve 37. Within the casing 38 of the valve 37 is revolvable cylinder 39, which is integrally mounted on the stem 36, and through the cylinder are the oil ducts or passages 40, 41, each finding suitable exits to oil line pipes at 42, 43, 44, 45. It is observed the passage 41 as the valve cylinder 39 is turned on its axis by gear 35 aligns itself with either of the three last-named exits, for the purpose of connecting with various oil lines attached to the valve at such orifice points. Attention is also called to the circumferentially disposed dead-end passages 60, 61 which are shown in Figure 5, leading to the exits or ports 43, and 45 respectively, and it is seen that as cylinder 39 is turned clockwise or anticlockwise from the central position shown in Fig. 5 the port 44 is closed and oil in these cases may enter through ports 43 or 45 and pass through passages 41 and 40, but when the cylinder is in position shown in Fig. 5 the oil can only enter through port 44 and pass through said passages to port 42. In other words valve 37 is a "three-way oil valve".

At 46 is shown another "three-way" rotary oil valve, quite similar to valve 37 only that same is vertically disposed. The said valve 46 has the three entrance ports 47, 48, 49 and the circumferential passages 50, 51, the port 48 corresponding to port 44 of the rotary valve just described, and the port 62 corresponding to the port 42. The inner cylinder 52 is provided with the shaft 53 on which is rigidly mounted the blade holder 54 having abutments 55, 56. The stem 9 of the piston in hydraulic jack 4 is provided with two raised or bossed portions 57, 58 which engage the abutments 56, 55 respectively, and in turn operate the valve cylinder 52 and valve 46. The oil line connection between the valves 37 and 46 will be described below in connection with the oil pipe line system. The valve 46 is also connected with the sump 5 by a pipe line as will be described.

The oil pipe line system for connecting the various parts of the invention may be described as follows: In the diagram 9 the valves 37 and 46 are shown, and the oil pump 6 and the hydraulic jack, are also shown. The pipe line 63 extends from the pump 6 to the port 42 of the valve 37. The pipe line 64 also connects port 44 of the valve 37 with port 62 of valve 46. Another oil pipe 65 connects port 48 with the sump 5. The circuit of oil travel just described will be designated as the neutral circuit for the purpose described herein.

From one end of the hydraulic jack at point 66 is connected a pipe line 67 which connects with orifice 45 of the valve 37. A third oil pipe line 68 connects orifice 43 of valve 37 with the opposite end of hydraulic jack 4 at point 69. Another pipe line 70 connects the orifice 49 of valve 46 with the end of the hydraulic jack at point 71. A sixth pipe line 72 connects with port 47 of the valve 46 with the opposite end of the hydraulic jack to that last mentioned at point 73. At points 74 and 75 are located relief valves such as 76, Figures 10 and 11 of the drawings. These relief valves are preferably of the needle type, the passage 77 of such valve being in connection with the interior of the hydraulic jack 4 and the passage 78 of the valve connects with pipe line 79, which leads to the sump 5 at point 80. The oil line 81 is similar to 79 and connects at point 82 with the said sump 5. It is evident that the needle valve shown in Figure 11 is adjustable and the oil flow through the pipe lines 79 and 81 can be readily adjusted thereby.

The oil circuit has one route of flow which is designated as the neutral circuit, in that when same is operating no oil pressure is delivered to the hydraulic jack 4 and therefore no operation of the instrumentalities connected with the vehicle "banking" or tilting mechanism takes place.

This circuit is by line 63, valve 37, line 64, valve 46, line 65 and the sump 5.

The neutral circuit is open when the car steering wheel is on center, and valve 37 is as shown in Figure 5; the oil flows into the valve 37 through orifice 42, through passages 40, 41 to exit orifice 44 to pipe line 64; thence to orifice 62 of valve 46 and makes exit therefrom through orifice 48 and from there through pipe 65 to the sump 5 of the pump, and thence to pipe 63 and to valve 37, completing an oil circuit which does not operate the device in hand in any way. This condition occurs when the car steering wheel is on center ready to drive the car in a straight line.

Next suppose the driver makes a right turn with the steering wheel, the stem 33 operates its worm 34, and with it the worm gear 35 and the cylinder of valve 37 which action closes the valve orifice 44 and pipe 64, so the neutral circuit of oil flow is temporarily closed. However by the turning of valve cylinder 39 of said valve 37, orifice 45 of the valve is opened to permit the oil coming into the valve through orifice 42 from pipe 63 to pass through pipe line 67 and to the hydraulic jack at point 66 Fig. 9. Notice that while valve 37 is in this position the pipe line 68 is inactive for the reason that passage 41 and orifice 43 of the valve are closed to the passage of oil therethrough. The oil under pressure admitted then through pipe 67 now pushes the piston head 8 and its piston stems 9 and 10 to the left as seen in Figure 9, and this action does two things, to wit, the rack 11 operates the transverse shaft 13 and its associated parts and "banks" or "tilts" the frame of the automobile, so the channel 3 on the outer side of the turn in the road is elevated by the jack shaft 22, and the other channel 2 is depressed, thereby accomplishing the primary purpose of the invention; and the other result produced by the movement of the piston head 8 is the actuation of the inner cylinder of valve 46 by means of the piston stem 9 and the parts 58, 55. The movement of the said inner cylinder of valve 46 to the left as seen in Figure 8 closes the orifices 47, 48 but opens the orifice 49 to the pipe line 70. When the steering wheel and shaft 33 is brought back to its central position for straight ahead driving, it is evident the inner cylinder 39 of valve 37 is turned again to the position shown in Figure 5, thus opening orifice 44 and pipe 64 to the valve 46. As orifice 49 of valve 46 is already open, oil under pressure passes through said valve to pipe line 70 and into the hydraulic jack 4 at point 71. This pressure then brings the piston head 8 slowly back to central position as seen in Figure 9. As the piston head 8 moves back to center position it carries piston stem 9 with it and the part 57 thereon (Figs. 7 and 8) engages part 56 and moves the inner cylinder of valve 46 back to position shown in Figure 8, thus closing orifice 49 and opening orifice 48 and permitting oil coming from valve 37 through valve 46 to enter pipe 65 which leads to the sump 5 of the oil pump 6. In this event the neutral circuit of oil travel comes into operation through line 63, valve 37, line 64, valve 46, and line 65, under which circumstance the pump may still operate, due to its continued operation by the revolution of the drive shaft of the automobile, without causing any movement of the piston head 8 of the jack, or the piston stem 10. As long as the latter does not move it is evident there is no operation of the transverse shaft 13, and no "banking" or "tilting" action of the automobile frame takes place.

Let us suppose the steering wheel shaft 33 is turned now to the left then the valve 37 is operated in a reverse direction, the orifice 43 is connected with orifice 42 through the passages 40, 41 within the valve, and the flow of oil takes place from pipe 63, to and through the said valve to pipe 68 and oil enters the hydraulic jack 4 at point 69. This action moves the piston head 8, and the piston stems 9 and 10 advance to the right as seen in Figure 9. The action just described cuts off line 64 of the idler or neutral circuit. However the piston stem 9 in moving to the right operates valve 46 so that orifice 47 is opened to flow of oil and pipe line 72 opened to the hydraulic jack 4 at point 73.

When the steering wheel and shaft 33 is brought back to center position for straight ahead driving, the orifice 43 of valve 37 is closed and pipe line 68 shut off from further operation; and moreover orifice 44 is opened and pressure is admitted to line 64 to valve 46, and orifice 47 being open pressure reaches line 72, as before mentioned.

The pressure in pipe line 72 slowly pushes the piston head back to central position, and brings the piston 9 and valve 46 back to neutral position, as shown in Fig. 8, thus closing orifice 47 and opening orifices 48 and pipe 65 of the idler or neutral circuit.

It is seen that when piston head 8 was pushed to the right, the rack 11 actuated the transverse shaft 13 in a reverse direction to that at first described, when a right hand turn was made with the steering wheel shaft.

The operation of transverse shaft 13 operates the tilting mechanism for banking or tilting the automobile frame but also in a reverse direction to that which obtained when the steering wheel was turned to the right.

In making a left turn in a road it is seen the channel 2 is elevated and the channel 3 depressed by the mechanism operated by transverse shaft 13 as is at once understood.

Figure 4:
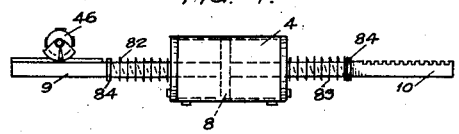
Figure 4 is a side elevation of the hydraulic jack and associated parts used with my invention.

In the event the steering wheel shaft 33 is not turned to central position after making a right or left turn, and stopping the car a pair of springs 82, 83 Figure 4 are provided, same being mounted on the piston stems 9 and 10 respectively, and each engage against a collar 84 on each stem, and against the outer side of a portion of the body of the hydraulic jack 4. These springs which are compressive springs, push the piston head 8 back to a neutral position as in Fig. 9 when necessary in order to operate valve 46 and open the port 48 therein to permit the flow of oil in the neutral circuit, as soon as valve 37 is properly opened with the orifice 44 open to pipe 64. This last is accomplished by turning the steering wheel and stem 33 back to central position.

If there is any excess of oil pressure in the hydraulic jack 4 after and during progress of the piston head 8 to extreme positions to the right or left ends of the jack, the relief valves 76, 76 are adjusted to permit a slow flow of oil to the sump 5 of the pump 6 through the pipes 79 and 81 as is at once understood. It is seen also that by gradual relief of oil pressure through one of the relief valves while the piston is being advanced to the right or left as seen in Figure 9, a cushioning effect is produced for the progress of the piston head, preventing sudden jars in vibration in the operation of the oil system and in the tilting mechanism connected with said jack.

Figure 2:
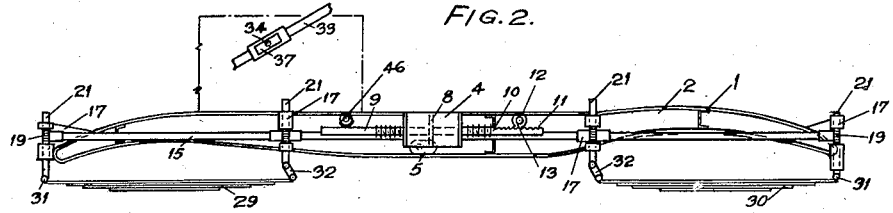
Figure 2 is a longitudinal vertical section on line 2—2 of Figure 1.

In Figure 12 is shown a modified form of the means of attachment of the raising and lowering mechanism at the forward end of the frame of the vehicle, in which instead of having a two point mounting of the vertical jack shafts 21, 22 on the springs 29 of the vehicle, a single mounting on the top of a "knee-action" spring 85 is shown. In this Figure 12 the jack shaft 86 is mounted in its support 87 on the frame, 2, and the longitudinal rod 15 operates said shaft as before described in connection with shafts 21, 22, Figures 1, 2 and 3 of the drawings. The shaft 86 in this modification however is pivotally mounted on the top of the spring 85 so that the front end of the frame 1 is in this case supported in one mounting only, on each side of the vehicle, as is at once understood. The purpose of this modification is to provide a means of using the present invention with the latest type of knee-action springs in current use on automobiles. The raising and lowering mechanism otherwise may be as shown and described in connection with the first form of the invention.

I claim:

1. A device for raising one side and lowering the other side of the chassis of a vehicle with relation to its springs to overcome the effect of centrifugal force on the occupants of said vehicle when travelling around a curve in the roadway, comprising a vehicle having a drive shaft and a frame, a mechanism for raising the vehicle frame on the outer side of the curve, and lowering said frame on the inner side of the curve, means for actuating said mechanism, a hydraulic jack having a piston stem in operating engagement with said mechanism, an oil pump connected with the jack, means for operating the pump from the drive shaft of the vehicle, a steering wheel stem having a worm thereon, an oil control valve in operative engagement with said worm, an intermediate oil valve operated by the hydraulic jack piston stem, and a system of oil pump lines, connecting both the said valves with the oil pump, and oil conveying means connecting the oil control valve with the jack for actuating the latter, and operating the raising and lowering mechanism, when the stem of the steering wheel is turned on its axis.

2. In a device for raising one side and lowering the other side of the chassis of a vehicle with relation to its springs to overcome the effect of centrifugal force on the occupants of said vehicle when travelling around a curve in the roadway, comprising a vehicle having a drive shaft and a frame, a mechanism for raising the vehicle frame on the outer side of the curve, and lowering said frame on the inner side of the curve, means for actuating said mechanism, comprising a hydraulic jack having a head and a piston stem in operating engagement with said mechanism, and provided with a pair of valve operating cams, an oil pump, means for operating the pump from the drive shaft of the vehicle, a steering wheel stem having a worm thereon, an oil control valve in operative engagement with said worm, an intermediate oil valve operated by the hydraulic jack piston stem cams, a system of oil pipe lines, connecting both the said valves with the oil pump and with each other, and means connecting the oil control valve with the jack, adapted to actuate the said last-named instrumentality to operate the said raising and lowering mechanism when the stem of the steering wheel is turned on its axis, oil flow means connected with the intermediate valve and the opposed ends of the jack for returning the piston head of the jack to a central position after being operated, and means for relieving the oil pressure in the hydraulic jack when the same is operated.

3. In a device for raising one side and lowering the other side of the frame of a vehicle, with relation to its springs when travelling around a curve, comprising a mechanism for raising and lowering the respective sides of the vehicle frame; a vehicle drive shaft, provided with a clutch, a hydraulic jack having a piston head therein, a reciprocating piston stem on one side of the piston head having a rack thereon in operative engagement with the raising and lowering mechanism, a reciprocating piston stem on the opposite side of the piston head, a pair of cams on said last-named piston stem, an oil control valve, oil flow means connecting the control valve with the opposed ends of the jack, a steering wheel stem in operative engagement with the control valve, an intermediate oil valve in operative relation with the piston stem cams, an oil pump receiving its actuation from the operation of the drive shaft of the vehicle, at a point at the rear of the clutch, oil flow means connecting the control valve, the intermediate valve and the pump together to provide an idling circuit for the passage of oil therethrough when the piston head of the jack is not in operation, means for returning the piston head of the jack to central position after same has been operated, comprising oil-flow means connected with the intermediate valve and the opposed ends of the jack, a pair of relief valves near the opposed ends of the jack, and oil-flow means connecting the pump with each of the said relief valves.

4. In a device of the class described, a means for raising the one side of the vehicle frame and lowering the opposite side thereof in relation to the vehicle springs when the vehicle is travelling around a curve in the road, comprising a vehicle having a frame, a drive shaft and a steering wheel stem, an oil pump adapted to be actuated by the revolution of the drive shaft, a hydraulic jack adapted to be operated by oil pressure derived from the oil pump, a mechanism operatively connected with the hydraulic jack for raising and lowering the opposed sides of the vehicle frame at one and the same time, and means for controlling the operation of the jack when the steering shaft is rotated.

5. In a device for raising the one side of a vehicle frame and lowering the opposite side thereof, comprising a pair of revolvably mounted longitudinal shafts each mounted adjacent to one of the sides of the vehicle, a plurality of gears on each of said shafts, means adjacent each of the said gears and in engagement with same for raising and lowering the opposite sides of the vehicle, a transverse shaft in actuating engagement with the said longitudinal shafts, a steering wheel stem and a drive shaft mounted on the vehicle, and means connected with the vehicle drive shaft, and the steering wheel stem for operating the said transverse shaft.

6. In a device for raising and lowering the opposed sides of a vehicle having a frame, a steering wheel stem, and a drive shaft, a pair of longitudinal shafts each of which is mounted on one of the sides of said frame, a plurality of pinions on each shaft, a vertically disposed shaft for each pinion, slidably mounted on the sides of the frame, a rack on each vertical shaft each in engagement with one of the pinions, a transverse shaft revolvably mounted on the vehicle frame, a worm near each end of said transverse shaft, a worm gear on each longitudinal shaft, in engagement with one of the worms on the transverse shaft, for revolving the longitudinal shafts, means connected with the vehicle drive shaft adapted to actuate the transverse shaft, and means connected with the steering wheel stem for operating and controlling the means which actuates the said transverse shaft.

7. In a device for raising and lowering the opposed sides of a vehicle having a frame, a steering wheel stem, and a drive shaft, a pair of longitudinal shafts each of which is mounted on one of the sides of said frame, a plurality of pinions on each shaft, a vertically disposed shaft for each pinion slidably mounted on the sides of the frame, a rack on each vertical shaft in engagement with one of the pinions, a transverse shaft revolvably mounted on the vehicle frame, a worm near each end of the said transverse shaft, a worm gear on each longitudinal shaft, in engagement with one of the worms on the transverse shaft, for revolving the longitudinal shafts, means connected with the vehicle drive shaft adapted to actuate the transverse shaft, means connected with the steering-wheel stem for operating and controlling the means which actuates the said transverse shaft, comprising a worm on the steering wheel shaft, an oil control valve connected with said worm, an intermediate oil valve, and oil conveying means connecting the various parts of the operating and controlling means for the transverse shaft.

8. In a device for raising and lowering the opposite sides of a motor vehicle when the steering wheel is rotated, a transverse operating shaft, mechanism connected with the latter for raising and lowering the vehicle frame, an oil pump, a hydraulic jack having a piston head, a pair of opposed piston stems on the piston head, a rack on one of said piston stems in operative engagement with the said transverse shaft, a pair of bossed cams on the other piston stem, a steering wheel stem having a worm thereon, an oil control valve adjacent to said stem, adapted to be operated by the said worm, an intermediate oil valve connected with the control valve and the oil pump, an oil pipe connecting the oil pump with the control valve, oil pipe lines from the control valve to the opposed ends of the hydraulic jack for operating the piston head of same in opposite directions, means on the intermediate valve for operating same, adapted to be engaged by the cams on the piston stem, and oil pressure means controlled by the operation of the two valves for returning the piston head to a central position in the jack when said head has reached an extreme position adjacent to either end of the hydraulic jack.

9. A device for raising one side and lowering the other side of the chassis of a vehicle to overcome the effect of centrifugal force on the occupants of said vehicle when traveling around a curve in the roadway, comprising a vehicle having a drive shaft and a frame, a mechanism for raising the vehicle frame on the outer side of the curve, and lowering said frame on the inner side of the curve, means for actuating said mechanism, comprising a hydraulic jack having a head, and a piston stem in operating engagement with said mechanism, and provided with a pair of valve operating cams, an oil pump, means for operating the pump from the drive shaft of the vehicle, a steering wheel stem having a worm thereon, an oil control valve in operative engagement with said worm, an intermediate oil valve operated by the jack piston stem cams, a system of oil pipe lines, connecting both the said valves with the oil pump and with each other, and means connecting the oil control valve with the jack, adapted to actuate the last-named instrumentality to operate the said raising and lowering mechanism, when the stem of the steering wheel is turned on its axis, oil-flow means connected with the intermediate valve and the opposed ends of the jack for returning the piston head of the jack to a central position after being operated, and auxiliary means for returning the piston head of the jack to central position therein after being operated, for use when the said oil-flow means is not operated.

10. In a device for raising one side and lowering the other side of the chassis of a vehicle to overcome the effect of centrifugal force on the occupants of said vehicle when travelling around a curve in the roadway, comprising a vehicle having a drive shaft and a frame, a mechanism for raising the vehicle frame on the outer side of the curve and lowering said frame on the inner side of the curve, means for actuating said mechanism, comprising a hydraulic jack, having a head and a piston stem in operating engagement with said mechanism, and provided with a pair of valve operating cams, an oil pump, means for operating the pump from the drive shaft of the vehicle, a steering wheel stem having a worm thereon, an oil control valve in operative engagement with said worm, an intermediate oil valve operated by the hydraulic jack piston stem cams, a system of oil pipe lines, connecting both the said valves with the oil pump and with each other, and means connecting the oil control valve with the jack, adapted to actuate the said last-named instrumentality to operate the said raising and lowering mechanism when the stem of the steering wheel is turned on its axis, and auxiliary spring means for returning the piston head of the jack to central position therein after being operated.

11. In a device for raising one side and lowering the other side of the chassis of a vehicle to overcome the effect of centrifugal force on the occupants of said vehicle when travelling around a curve in the roadway, comprising a vehicle having a drive shaft and a frame, a mechanism for raising the vehicle frame on the outer side of the curve, and lowering said frame on the inner side of the curve, means for actuating said mechanism, comprising a hydraulic jack, having a head and a piston stem in operating engagement with said mechanism, and provided with a pair of valve operating cams, an oil pump, means for operating the pump from the drive shaft of the vehicle, a steering wheel stem having a worm thereon, an oil control valve in operative engagement with said worm, an intermediate oil valve operated by the hydraulic jack piston stem cams, a system of oil pipe lines, connecting both the said valves with the oil pump, and with each other, and means connecting the oil control valve with the jack, adapted to actuate the said last-named instrumentality to operate the said raising and lowering mechanism, when the stem of the steering wheel is turned on its axis, and auxiliary means for returning the piston head of the jack to central position therein after being operated, comprising a collar rigidly mounted on each end of the piston stem, and a pair of springs on opposite ends of said stem, each in engagement with a collar and the end of the jack.

12. In a device for raising and lowering the opposed sides of a vehicle having a frame, a number of vehicle springs, a steering wheel stem, and a drive shaft, a pair of longitudinal shafts each of which is mounted on one of the sides of said frame, a plurality of pinions on each of said shafts, a vertically disposed jack shaft for each pinion slidably mounted on the sides of the frame, and connected with the vehicle springs, a rack on each vertical shaft in engagement with one of the pinions, a transverse shaft revolvably mounted on the vehicle frame, a worm near each end of said transverse shaft, a worm-gear on each longitudinal shaft in engagement with one of the worms of the transverse shaft for revolving the longitudinal shafts, in opposite directions simultaneously, a hydraulic jack adapted to operate the transverse shaft, means for actuating the hydraulic jack driven by the said drive shaft, and means connected with the steering wheel stem for controlling the hydraulic jack actuating means.

13. In a device for raising and lowering the opposite sides of the frame of a vehicle when going around a curve, including a plurality of vertically slidable jack shafts mounted on opposite sides of the vehicle frame, and each shaft connected with one end of each of the vehicle springs, a single hydraulic jack having a piston stem protruding from said jack, means connecting said piston stem with the plurality of jack shafts, and adapted to operate the jack shafts on each side of the vehicle frame in opposite directions, a steering wheel stem and a drive shaft on the vehicle, oil flow means connected with said drive shaft for operating the hydraulic jack, and means connected with the steering wheel stem for controlling the action of the hydraulic jack in accordance with the direction of travel of the vehicle.

14. In a device for raising and lowering the opposite sides of the frame of a vehicle when going around a curve, comprising a plurality of vertically slidable jack shafts mounted on opposite sides of the vehicle frame, and each shaft connected with one end of each of the vehicle springs, a single hydraulic jack having a protruding piston stem on one side of same, operating means connecting said stem with the vertical jack shafts, and adapted to operate such shafts in opposite directions on the opposite sides of the vehicle, a second protruding piston stem on the hydraulic jack, oil flow means connected with the drive-shaft of the vehicle for operating said jack, a steering wheel stem, control means for controlling the action of the oil flow connected with the steering wheel stem, and the last named piston of the hydraulic jack, adapted to actuate the jack in accordance with the direction of rotation of the steering wheel stem.

JOHN ADASKIN.